(12) United States Patent
Heinz et al.

(10) Patent No.: US 12,248,071 B2
(45) Date of Patent: Mar. 11, 2025

(54) 3D TIME-OF-FLIGHT CAMERA AND METHOD OF DETECTING THREE-DIMENSIONAL IMAGE DATA

(71) Applicant: SICK AG, Waldkirch (DE)

(72) Inventors: Matthias Heinz, Waldkirch (DE); Thorsten Pfister, Waldkirch (DE); Josef Baak, Waldkirch (DE)

(73) Assignee: SICK AG, Waldkirch (DE)

( * ) Notice: Subject to any disclaimer, the term of this patent is extended or adjusted under 35 U.S.C. 154(b) by 1142 days.

(21) Appl. No.: 17/104,443

(22) Filed: Nov. 25, 2020

(65) Prior Publication Data

US 2021/0157007 A1 May 27, 2021

(30) Foreign Application Priority Data

Nov. 26, 2019 (DE) ...................... 10 2019 131 988.9

(51) Int. Cl.
*G01S 17/894* (2020.01)
*G01S 7/4915* (2020.01)
*G01S 17/931* (2020.01)

(52) U.S. Cl.
CPC .......... *G01S 17/894* (2020.01); *G01S 7/4915* (2013.01); *G01S 17/931* (2020.01)

(58) Field of Classification Search
CPC ................................ G01S 17/36; G01S 7/4915
See application file for complete search history.

(56) References Cited

U.S. PATENT DOCUMENTS

| 10,382,736 | B1* | 8/2019 | Thurner | H04N 13/296 |
| 2007/0140527 | A1* | 6/2007 | Yamamoto | G06V 20/58 |
| | | | | 382/104 |
| 2015/0338509 | A1* | 11/2015 | Lange | G01S 17/894 |
| | | | | 356/5.01 |

(Continued)

FOREIGN PATENT DOCUMENTS

| DE | 19704496 A1 | 3/1998 |
| DE | 102010003409 A1 | 9/2011 |

(Continued)

*Primary Examiner* — Luke D Ratcliffe
*Assistant Examiner* — Clara G Chilton
(74) *Attorney, Agent, or Firm* — Nath, Goldberg & Meyer; Jerald L. Meyer

(57) ABSTRACT

A 3D time-of-flight camera for detecting three-dimensional image data from a detection zone is provided, the 3D time-of-flight camera comprising an illumination unit for transmitting transmission light that is modulated with a first modulation frequency; an image sensor having a plurality of reception elements for generating a respective reception signal; a plurality of demodulation units for demodulating the reception signals with the first modulation frequency in order to obtain sampled values; and a control and evaluation unit that is configured to control the illumination unit and/or the demodulation units for a number of measurement repetitions, in each case with a different phase shift between the first modulation frequency for the transmission light and the first modulation frequency for the demodulation, and that is configured to determine a distance value from the sampled values obtained per light reception element by the measurement repetitions. In this respect, the control and evaluation unit is furthermore configured to change the number of measurement repetitions.

16 Claims, 2 Drawing Sheets

(56) References Cited

U.S. PATENT DOCUMENTS

Figure 1:
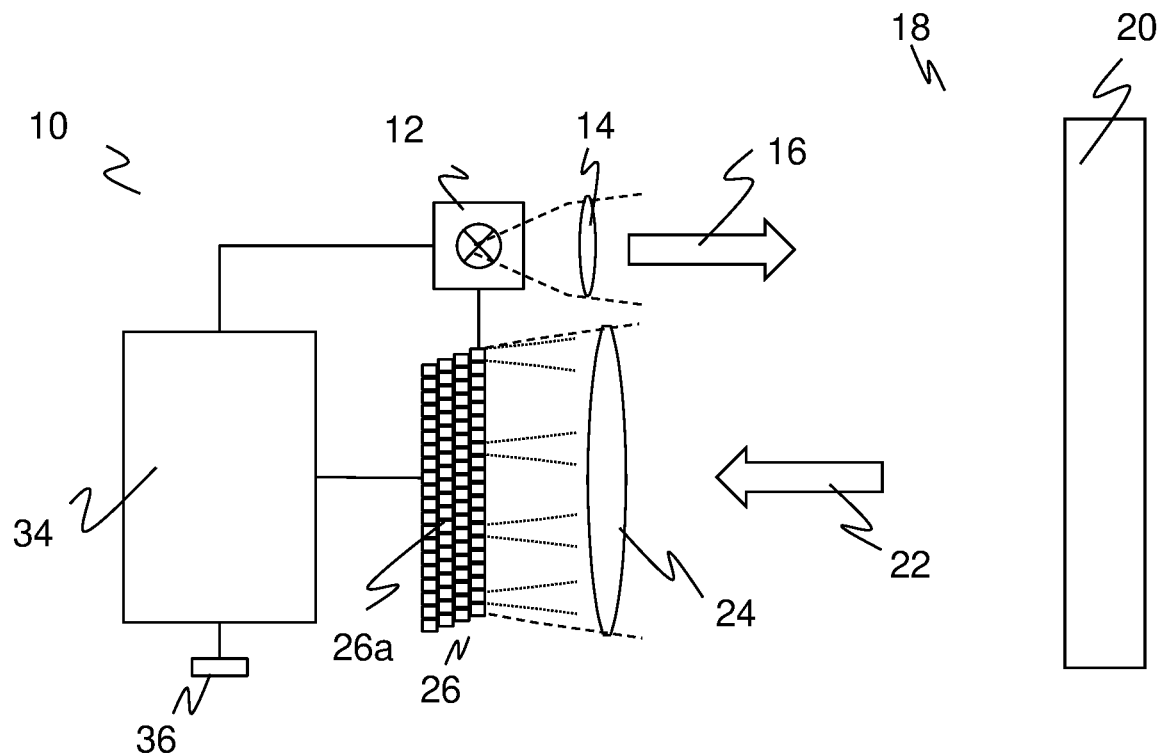

| | | | |
|---|---|---|---|
| 2016/0189761 A1* | 6/2016 | Noguchi | G06F 12/0862 |
| | | | 365/158 |
| 2018/0284247 A1* | 10/2018 | Campbell | G01S 17/10 |
| 2019/0107608 A1 | 4/2019 | Ta | |
| 2019/0331776 A1* | 10/2019 | Aotake | G01S 7/497 |

FOREIGN PATENT DOCUMENTS

| | | |
|---|---|---|
| DE | 102013207653 B4 | 11/2013 |
| DE | 102015223674 A1 | 6/2016 |
| EP | 1777747 A1 | 4/2007 |
| EP | 2 894 492 A1 | 7/2015 |
| EP | 3 159 711 A1 | 4/2017 |
| EP | 3 301 479 A1 | 4/2018 |
| WO | 2014022490 A1 | 2/2014 |

* cited by examiner

3D TIME-OF-FLIGHT CAMERA AND METHOD OF DETECTING THREE-DIMENSIONAL IMAGE DATA

The invention relates to a 3D time-of-flight camera and to a method of detecting three-dimensional image data from a detection zone.

Unlike a conventional camera, a 3D camera also records depth information and thus generates three-dimensional image data having spacing values or distance values for the individual pixels of the 3D image that is also designated as a distance image or a depth map. The additional distance dimension can be utilized in a plurality of applications to obtain more information on objects in the scene detected by the camera and thus to fulfil different tasks.

For example, in automation technology, objects can be detected and classified on the basis of three-dimensional image data in order to make further automatic processing steps dependent on which objects, preferably including their positions and orientations, were recognized. The control of robots or of different types of actuators at a conveyor belt can thus be supported, for example.

In the case of vehicles that operate on public roads or in a closed environment, specifically in the field of factory automation and logistics automation, the total environment and in particular a planned route should be detected as completely and three-dimensionally as possible by a 3D camera. This relates to practically all conceivable vehicles, whether vehicles with a driver such as passenger vehicles, trucks, work machines and fork-lift trucks or driverless vehicles such as AGVs (automated guided vehicles), AGCs (automated guided carts), AMRs (autonomous mobile robots), or floor-level conveyors. The image data is used to enable the autonomous navigation or to assist a driver to, among other things, recognize obstacles, to avoid collisions or to facilitate the loading and unloading of transport goods, including cardboard boxes, pallets, containers, or trailers.

In safety technology, the 3D camera detects persons in the environment of a hazard zone, for example, of a machine or specifically of a robot. If an unauthorized intrusion into a protected volume or a falling below of a safety distance from the machine is recognized, a safety relevant response takes place to avoid an accident. Sensors used in safety technology have to work particularly reliably and must therefore satisfy high safety demands, for example the EN13849 standard for safety of machinery and the machinery standard IEC61496 or EN61496 for electrosensitive protective equipment (ESPE). To satisfy these safety standards, a series of measures have to be taken such as a secure electronic evaluation by redundant, diverse electronics, a functional monitoring or specifically a monitoring of the contamination of optical components.

Different processes are known for determining the depth information. In this description, a time-of-flight measurement based on a phase method (TOF, time of flight, or lidar, light detection and ranging) is considered. In this respect, a scene is illuminated with amplitude-modulated light. The light returning from the scene is received and is demodulated with the same frequency that is also used for the modulation of the transmission light (lock-in method). An amplitude measurement value that corresponds to a sampled value of the reception signal results from the demodulation. However, in accordance with the Nyquist criterion, at least two sampled values are required for the phase determination of a periodic signal. Therefore, the measurement is performed with different relative phase positions between the signals for the transmission-side modulation and the reception-side demodulation. Thus, the absolute phase shift, caused by the time of flight, between the transmission signal and the reception signal can then be determined and is in turn proportional to the object distance in the scene.

Figure 3A:
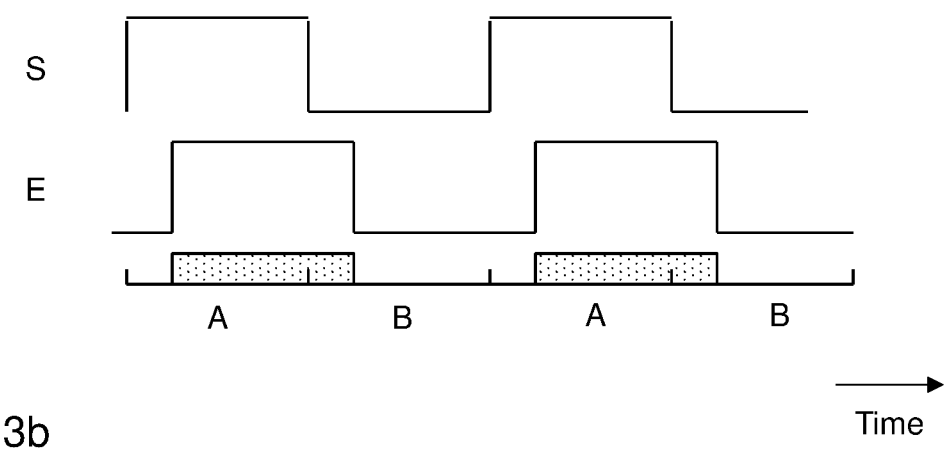

FIG. 3a shows a conventional modulation scheme. At the top, the transmission light that is periodically modulated with the modulation frequency is represented by S. The returning reception light therebelow is designated by E and has a phase shift from the transmission light S depending on the distance of the object at which the transmission light was reflected. At the bottom, time periods are shown that are assigned to charge stores of the respective pixel of the camera in which the photoelectrons generated within the respective time period are stored. The time periods do not, as shown, have to be selected flush with the transmission light, but a possible time offset should be taken into account since otherwise a measurement error of the phase and thus of the distance results.

In FIG. 3a, there are two different charge stores A and B at each pixel between which a switch is made to and fro with the modulation frequency of the transmission light. An integration is performed over a plurality of modulation periods, i.e. the charging charge stores are summed up and only then is the total charge read out from the pixels, with FIG. 3a showing two such modulation periods. The sought phase results from $B/(A+B)$.

A disadvantage of this simple measurement is the sensitivity with respect to external light or background light. The minimum number for the phase determination of a periodic signal, as stated above, is indeed just reached with the two values A and B in this manner. However, at least one further sampled value is absent for the additional consideration of the further variable background light that is a constant when a constant level is assumed. Additional measurements can be performed to also take background light into account and for further reasons such as the compensation of non-linearities and asymmetries in the pixels of the image sensor that cause relatively high unknown systematic measurement deviations. More than two individual measurements are then required to obtain a depth value per pixel or, in other words, a frame of the 3D image recording comprises more than two individual measurements. To determine the background light, there is alternatively the possibility of increasing the number of charge stores of the pixels, wherein a compensation of asymmetries in the pixels is, however, not thereby achieved without repeat individual measurements.

Figure 3B:
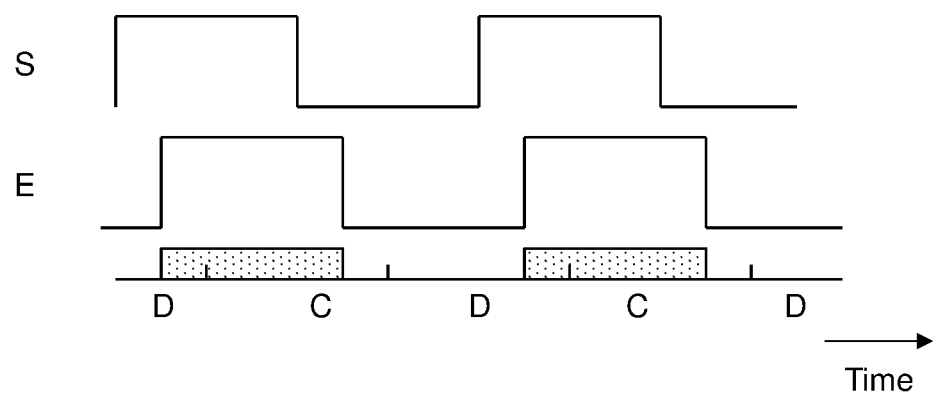

An extended modulation scheme for four sampled values is jointly shown in FIGS. 3a and 3b. The values A and B are determined by the measurement in accordance with FIG. 3a. A further measurement takes place in accordance FIG. 3b in which the time periods, after each of which a switching to and fro between the two charge stores takes place, are shifted by ¼ of the period of the modulation frequency. To distinguish the measurement values obtained in this way, they are designated by C and D. The sought phase now results from $\arctan((C-D)/(A-B))$.

An introductory discussion of the two methods presented by means of FIGS. 3a and 3b can, for example, be found by the paper by Li, Larry, "Time-of-flight camera—an introduction", Technical white paper SLOA190B (2014).

In addition to the sketched measurements with two or four sampled values, variants with three sampled values at 0°, 120°, and 240° are also known. In an alternative image sensor architecture, the measurement values of the two charge stores A and B cannot be read out individually, but they are rather differential pixels that output a value A-B. Furthermore, it is known to measure the sampled values such as A, B, C, and D once more with a 180° phase shift in order to compensate asymmetries in the pixels.

The respective number of sampled values brings along different advantages and disadvantages that can be useful for different applications. The more sampled values are obtained, the higher the measurement accuracy becomes or the smaller the depth measurement deviations become. With fewer sampled values, the measurement errors become larger, but the recording time decreases and fewer motion artifacts are produced. Known 3D time-of-flight cameras use a fixed number of sampled values so that the choice of the suitable measuring method can only take place by purchasing the camera.

A further aspect of the time-of-flight measurement with a phase method is the limited non-ambiguity range since the phase shift is only unambiguous up to the period of the modulation frequency. To extend the non-ambiguity range and thus the range of the camera, measurements are frequently performed successively with a plurality of different modulation frequencies. An alternative lowering of the modulation frequency can only be considered within narrow limits since the measurement accuracy is thereby impaired. The measurement with a plurality of modulation frequencies combines a high depth resolution with a large depth measurement range. This range increase is possible for any number of measurement repetitions.

When used in mobile applications, for instance at a vehicle, the energy consumption of the camera is decisive for its runtime. The illumination for generating the depth values in this respect makes a large contribution to the energy consumption. However, there has been no satisfactory solution for saving energy so far. A measurement with only a single modulation frequency either limits the measurement accuracy or the non-ambiguity range or the range of the camera. The same equally applies in a weakened form if a measurement is not fixedly performed with a single modulation frequency, but the number of modulation frequencies is rather reduced at times. A switching off of the illumination in breaks in which no measurement values are required makes the system completely blind. An external criterion and thus an external system are therefore required to define and end the shutdown phases. If the camera is switched off overall, it requires some time after the switching back on until the measurement has thermally settled again so that additional dead times still result.

EP 3 159 711 A1 discloses a system that measures distances from an object using a phase-based time-of-flight method. In this respect, the illumination is not areal, but a plurality of individual lasers rather each illuminate individual reception pixels in order to achieve a larger range. Background light is measured either with the aid of surrounding pixels or by a further exposure cycle without modulated transmission light and is then subtracted in the evaluation. In EP 3 301 479 A1, this digital background compensation is already replaced in an analog manner by a partial discharge even before the digitizing. For this purpose, the charges of the pixels accumulated in a first exposure cycle during the time-of-flight measurement are partially discharged again, depending on the present background light, in a second exposure cycle without modulated transmission light.

EP 2 894 492 A1 deals with a method of measuring the time of flight using pixels that each have four charge stores. The charge stores are controlled in groups of two.

A context-dependent adaptation of camera parameters, such as the frame rate or the exposure time, is known from WO 2014/022490 A1.

It is therefore an object of the invention to provide a better adapted 3D time-of-flight camera.

This object is satisfied by a 3D time-of-flight camera and by a method of detecting three-dimensional image data from a detection zone in accordance with the respective independent claim. The 3D time-of-flight camera basically works such as was described in the introduction. An illumination unit generates transmission light that is modulated with a first modulation frequency. It must be stated as a precaution that this is an artificial amplitude modulation with a selected modulation frequency that should not be confused with the carrier frequency of the actual light wave. The transmission light reflected from objects in the detection zone is incident, superposed by external light or background light, onto an image sensor having a plurality of reception elements or pixels that generate a respective reception signal therefrom.

A plurality of demodulation units obtain a sampled value from the respective reception signal in a lock-in method by a demodulation with a signal of the first modulation frequency. A number of at least two measurements with a different phase between the signals are performed with the modulation frequency for the transmission light and for the demodulation. They are sequential measurement repetitions through repeat exposure and/or parallel measurements in a plurality of charge stores of the reception elements. The phase position of the reception signal is reconstructed from the plurality of sampled values to obtain the time of flight and finally the distance therefrom.

The measurements are controlled and evaluated by a control and evaluation unit. In this respect, the demodulation units are preferably already implemented in the pixels that are then also designated as ToF pixels (ToF, time of flight) or lock-in pixels. Further parts of the control and evaluation unit, in particular those that are responsible for the measurement repetition and/or the reconstruction of the phase from a plurality of sampled values, can also already be implemented in the pixels or on the image sensor.

The invention starts from the basic idea of enabling an adaptation of the number of measurement repetitions. Therefore, the control and evaluation unit is configured to change the number of measurement repetitions. Measurement repetitions do not mean repeated image recordings or frames, but rather the measurement repetitions that contribute to a distance measurement and thus to an image recording or to a frame.

The invention has the advantage that a weighing up between the advantages and disadvantages of the measurement with different numbers of measurement repetitions now becomes possible. The distance measurement becomes more accurate due to a higher number of measurement repetitions. In this respect, the measurement accuracy in the distance direction or depth direction is meant since the lateral resolution is determined by the objective and the number of pixels. At the same time, the recording time or readout time also increases per distance value with a higher number of measurement repetitions, thus reducing the possible frame rate, and fast objects generate more motion artifacts. These advantages and disadvantages apply in mirror symmetry with a lower number of measurement repetitions. A particularly advantageous aspect is that an energy management becomes possible. A measurement with a high number of measurement repetitions leads to a higher energy consumption. Thus, the energy consumption can be minimized by working with a small number of measurement repetitions whenever possible. In accordance with the invention, the adaptation is possible for current requirements up to a change for each frame. Conventionally, a camera suitable for a specific situation can, in contrast, at most be purchased, but it is then no longer adaptable.

The light reception elements preferably each have a charge store and/or the number of measurement repetitions preferably amounts to two to five. Such pixels can provide only one sampled value in a measurement interval so that sequential measurement repetitions are necessary to obtain a plurality of sampled values. As discussed in the introduction, the phase can generally be determined by two measurement repetitions, but then does not take the background light into account. The background light can be compensated by a third measurement repetition. Further measurement repetitions obtain additional sampled values, for example, at 0°, 120°, and 240° or 0°, 90°, 180°, and 270° and thus obtain measurement accuracy, wherein a separate additional measurement can or cannot be provided for the background light, which then results in the number five in the case of four phases plus a background light measurement. As a precaution, it must be stated that a measurement repetition is understood as a single measurement and not, for instance in a literal interpretation of repetition, already as two single measurements.

The light reception elements preferably have two charge stores that are in particular read out differentially, wherein the number of measurement repetitions preferably amounts to two, three, or four. Two charge stores already provide two sampled values in a single measurement. In an embodiment with differential pixels, they can alternatively not be read out individually, but rather as a difference. Measurement repetitions here, on the one hand, as in the case of only one charge store, serve to obtain sampled values at other phases such as 90° or 120°. However, it can also be sensible to measure again in a manner offset by 180° in order to compensate asymmetries in the two channels formed by the charge stores. Depending on the embodiment, it is possible to switch between all three operating modes or a switchover is only possible between two numbers, for example, between two and four. Further alternatives with a different number of charge stores per pixel and/or measurement repetitions are conceivable, for example, four charge stores and two measurement repetitions. With such a pixel, four sampled values are already available after the first measurement and are generally sufficient for the phase determination. However, at least two measurement repetitions can be useful to compensate differences in the channels by a double measurement with a 180° phase shift or even four measurement repetitions are performed so that each channel is responsible once for each phase.

The control and evaluation unit is preferably configured for a change of the number of measurement repetitions for a subsequent operating phase. This is a kind of static switchover for a specific application or at least a longer operating phase, for instance, on the initialization or on a reconfiguration of the camera. The selection of the required number of measurement repetitions can be a parameterization that is based on the knowledge of the fitter. However, it is also conceivable to assist the fitter through measurement results or to make the selection automatically based on measurement results, on information received from a higher-ranking system, or on other external circumstances.

The control and evaluation unit is preferably configured for a dynamic change of the number of measurement repetitions during the operation. A dynamic switchover can flexibly and situationally respond to the current requirements, conditions, and measurement results. A dynamic switchover usually takes place frequently and quickly such as the dynamic criteria prescribe.

The control and evaluation unit is preferably configured to automatically change the number of measurement repetitions. In such embodiments, the camera itself decides on the suitable operating mode with the matching number of measurement repetitions.

The control and evaluation unit is preferably configured to situationally determine the respective changed number of measurement repetitions from the reception signals and/or distance values. The decision of the camera on the suitable operating mode is here consequently based on the detection results and is made within the camera. They are preferably rather early evaluation results of an image processing chain, i.e. evaluations of amplitude values or depth values and the like. However, more complex evaluations already in the camera are also conceivable, for example, the recognition of blur due to motion artifacts (motion blur) or the recognition of positions or even of motion patterns of detected objects (object tracking). Such complex image processing can be supported by external processing capacities of a higher-ranking system on site or also in a cloud or the like.

The control and evaluation unit is preferably configured to set a higher number of measurement repetitions if a near object or an object in a region of interest within the detection zone is detected. A higher number of measurement repetitions in particular means three, preferably four. A more accurate measurement for particularly relevant objects thereby takes place. They are regularly near objects in mobile applications. It is also conceivable that regions of interest (ROI, region of interest) are defined in the detection zone of the camera and are defined or configured in advance, but can also be placed by the camera itself, for example, around previously detected objects.

The control and evaluation unit is preferably configured to set a lower number of measurement repetitions as long as no object is detected and/or as long as only objects classified as uninteresting are detected. A lower number of measurement repetitions in particular means three, preferably two. As long as no relevant object is detected, measurement accuracy is not important, but it is rather important to detect a newly occurring object at all, whereupon the number of measurement repetitions can then be increased again. Which objects are relevant depends on the application situation. In some cases, the switchover to a lower number of measurement repetitions only takes place with a free field of view, which can in turn be limited to specific ROIs. On the other hand, objects can also be classified as uninteresting and can thus be treated as if they were not present with respect to a switchover to a lower number of measurement repetitions. This classification can take place in advance by a configuration or a reference recording or during the operation by an object classifier. Examples are walls of a room, an empty conveyor belt, or objects that are immovable relative to the camera over a certain period of time.

The control and evaluation unit is preferably configured to change the number of measurement repetitions cyclically or in accordance with a defined scheme. For example, a cyclic switchover means a change every n≥1 frames or at certain times. The switchover here takes place independently of a detection result. However, this should not preclude a detection result from modifying or at least temporarily overriding the cycle or the scheme.

The control and evaluation unit is preferably configured to set the number of measurement repetitions in accordance with an energy consumption of the 3D time-of-flight camera, in particular to keep the energy consumption constant or to ensure a minimum operating duration. As already mentioned, measurements with more measurement repetitions also require more energy so that an energy management becomes possible by changing the number of measurement repetitions. If the average electrical power thereby remains constant, the thermal balance in the camera is maintained and corresponding measurement fluctuations are avoided. An energy management is of particular interest for energy-autonomous cameras and controls a switchover between the operating modes in accordance with the required operating duration and the available charge of a rechargeable battery.

The camera preferably has a control input, wherein the control and evaluation unit is configured to set the number of measurement repetitions in accordance with a control signal at the control input. In such embodiments, the selection of a suitable number of measurement repetitions is predefined externally. The control signal is predefined via a specific control input or as part of a data exchange at present interfaces of the camera. The above-mentioned camera-internal criteria for a switchover, such as the evaluation of current or past detection results, can also be evaluated outside the camera in a higher-ranking local system or, for example, in a cloud. This preferably applies to more complex, later steps of an image evaluation chain such as object tracking. There is also the possibility of a common or shared evaluation internally and externally. Some switchover criteria, such as a vehicle speed or a planned or executed cornering, are only externally available. The external specification can also take place by a user who, for example, actuates a control input configured as a button for an energy-saving mode. In a higher-ranking evaluation, for example in a cloud, the measurement data of a plurality of cameras of a measurement system comprising a plurality of cameras can also be used to determine a criterion for the change of the measurement repetitions of individual or all cameras and to then generate corresponding control signals.

The control and evaluation unit is preferably configured to perform further measurement repetitions with at least a second modulation frequency, wherein the modulation frequencies and/or the number of modulation frequencies is/are in particular changed. The non-ambiguity range is extended by measuring with two or more modulation frequencies as explained in the introduction. A respective plurality of measurement repetitions are required for each modulation frequency, wherein the number of measurement repetitions is again preferably, but not necessarily, the same per modulation frequency. A change of the number of modulation frequencies and/or of at least one of the modulation frequencies used in this respect can take place after weighing up the range, the measurement accuracy, the measurement duration, and the energy consumption. This camera can thus be used even more flexibly.

The control and evaluation unit is preferably configured to change a frame rate at which distance values are generated. The frame rate cannot become faster than predefined by the respective selected number of measurement repetitions. However, a slowing down or a reversal of a slowing down is possible. For example, a measurement with two measurement repetitions can artificially obtain the same frame rate through waiting phases as a measurement with four measurement repetitions would have, or an even lower frame rate can be set. Energy can in particular additionally be saved in this manner.

The control and evaluation unit is preferably configured to adapt the transmission light of the illumination unit. There are numerous conceivable criteria for this purpose such as the required range of the measurement, specific regions of interest within the detection zone, or the external light load. The adaptation can take place by a switching on and off of illumination modules of the illumination unit or alternatively by means of an adaptive illumination unit that is designed such that the transmission light can be selectively distributed in space and/or time in the scene.

The control and evaluation unit is preferably configured, on a change of the number of measurement repetitions, to use one of a plurality of stored calibration data sets that matches the number. Thus, the camera is immediately and very simply calibrated in a correct manner for the respective number of measurement repetitions.

The method in accordance with the invention can be further developed in a similar manner and has similar advantages in this respect. Such advantageous features are described in an exemplary, but not exclusive, manner in the subordinate claims dependent on the independent claims.

Figure 2:
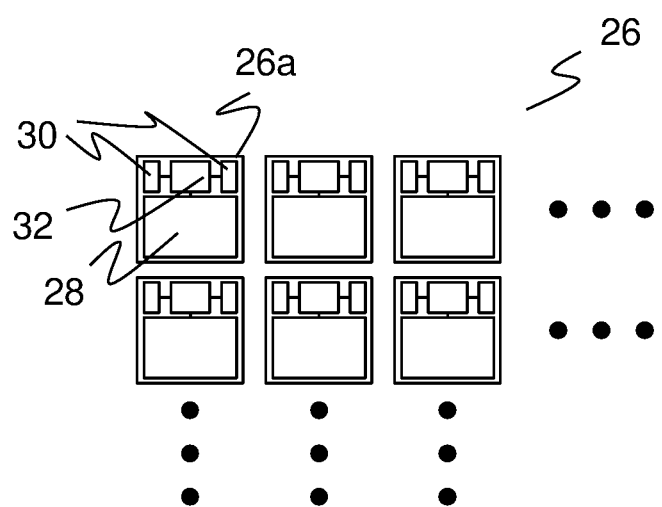

The invention will be explained in more detail in the following also with respect to further features and advantages by way of example with reference to embodiments and to the enclosed drawing. The Figures of the drawing show in:

FIG. 1 a schematic block diagram of a 3D time-of-flight camera;

FIG. 2 a plan view of the reception pixels of a 3D time-of-flight camera;

FIG. 3a a representation of a conventional modulation scheme with two sampled values for a distance measurement; and FIG. 3b a representation of a conventional extended modulation scheme with four sampled values.

FIG. 1 shows a schematic block diagram of a 3D time-of-flight camera 10. An illumination unit 12 transmits modulated transmission light 16 into a detection zone 18 through a transmission optics 14. LEDs or lasers in the form of edge emitters or VCSELs can be considered as light sources. The light transmitter 12 can be controlled such that the amplitude of the transmission light 16 is modulated with a frequency typically in a range from 1 MHz to 1000 MHz. The modulation is, for example, sinusoidal or rectangular and is in any event a periodic modulation. To reduce the mutual interference of a plurality of 3D time-of-flight cameras, an artificial jitter or a kind of coding (spread spectrum) can also be used. Due to the frequency, a limited non-ambiguity range of the distance measurement results so that small modulation frequencies are required for long ranges of the 3D time-of-flight camera 10. Alternatively, measurements are performed with two or more modulation frequencies to increase the non-ambiguity range in the combination of the measurements.

If the transmission light 16 is incident onto an object 20 in the detection zone 18, a portion is reflected back to the 3D time-of-flight camera 10 as reception light 22 and is guided there through a reception optics 24, for example a single lens or a reception objective, to an image sensor 26. The image sensor 26 has a plurality of light reception elements or reception pixels 26a arranged to form a matrix or a row, for example. The resolution of the image sensor 26 can range from two or a few up to thousands or millions of reception pixels 26a.

FIG. 2 shows a plan view of a section of the reception pixels 26a of the image sensor 26. This view is purely functional and schematic; the specific semiconductor design of the image sensor 26 is not the subject of this description. The reception pixels 26a each have a light-sensitive surface 28 and at least one charge store 30, for example, a capacitor. By way of example, there are two charge stores 30 in the embodiment in accordance with FIG. 2. Further switching elements of the reception pixels 26a are very schematically and purely symbolically combined in a block as a demodulation unit 32. The reception pixels 26a detect the reception light 22 in their charge stores 30 during a measurement duration or an integration period. In this respect, the demodulation unit 32 controls when charges are collected in the charge store 30 in accordance with the modulation frequency also used for modulating the transmission light 16. Consequently, a demodulation takes place in accordance with a lock-in method.

Back to FIG. 1, the charge quantities collected in the charge stores 30 of the reception pixels 26a are read out, digitized and transferred to an evaluation unit 34. Two sampled values are generated by the two charge stores 30 in one measurement. Alternatively to a single readout of both sampled values, differential reception pixels 26a are also conceivable that output a difference of the two charge stores 30. The information relevant for the phase determination is in this respect practically equivalent since differences are anyway formed in the evaluation. To obtain further sampled values, the measurement is repeated n times, preferably two to four times. In this respect, the phase between the modulation frequency used for the transmission light 16 and the modulation frequency used for demodulation in the demodulation unit 32 is in each case varied between the measurement repetitions.

In a specific advantageous embodiment, sampled values are obtained as follows, depending on the number of measurement repetitions. In this respect, it is required that the two charge stores 30 sample in a manner offset by 180° from one another since deviations therefrom are indeed possible, but are usually disadvantageous. With two measurement repetitions, a measurement is performed at 0° and 180° in the first measurement repetition and a measurement is performed at 90° and 270° in the second measurement repetition. With three measurement repetitions, they are preferably 0°, 180°; 120°, 300°, and 240°, 60° and with four measurement repetitions they are 0°, 180°; 90°, 270°; 180°, 0°; 270°, 90°. The latter seems redundant, but serves to compensate hardware-related differences in the two channels formed by the charge stores 30. Thus, a total of eight individual sampled values A, B, C, D, A', B', C', D' or, in the case of differential pixels, four differences of sampled values A–B, C–D, N–B', C'–D' are present. The sought phase then results as $\arctan(((C-D)-(C'-D'))/((A-B)-(A'-B'))))$. All the mentioned numerical values can also be varied, for example, in that a shift by 90° in each case does not take place in four measurement repetitions, but rather a shift by only 45°, whereby the hardware compensation is then omitted, but in return more intermediate values are detected.

The control and evaluation unit 34 now reconstructs the phase shift, which can be converted into a distance value per reception pixel 26a, from the plurality of sampled values on the basis of the time of flight through the detection zone 18. A three-dimensional image, a distance image, or a depth image, which is output at an interface 36, is produced. The interface 36 or alternatively one or more further connections, not shown, conversely serve for the input of control signals or parameterizations of the 3D time-of-flight camera 10.

The division of FIGS. 1 and 2 into an image sensor 26 having reception pixels 26a, which each have a demodulation unit 32, and a control and evaluation unit 34 is only one preferred embodiment. The control and evaluation functionality can also be distributed differently. Furthermore, the illumination shown is a surface illumination for which, for example, a diffuser is used as a part of the transmission optics 14. In another embodiment, an arrangement of numerous individual light sources of the light transmitter 12 is sharply projected into the detection zone 18 so that, as a result, the reception pixels 26a are individually illuminated and the range increases. Furthermore, in deviation from the representation, the illumination cannot be integrated into the 3D time-of-flight camera 10, but can be structurally or spatially separated therefrom.

In accordance with the invention, provision is now made that the 3D time-of-flight camera 10 enables a switchover of the number of measurement repetitions per time-of-flight measurement. It consequently provides a plurality of operating modes, in which it works with a different number of measurement repetitions in each case, and thus with more or fewer sampled values. The respective ideal operating state can thereby be set for respective applications, environments, and requirements. A measurement with a higher number of measurement repetitions has a high measurement accuracy, but requires a longer measurement duration. Conversely, the recording and processing time is shorter with fewer measurement repetitions and is in particular minimal with only two measurement repetitions, but the distance measurement is not as accurate. There is therefore an exchange relationship between the measurement accuracy and the reaction time and the respective ideal can be set therebetween by switching the number of measurement repetitions.

Alternatively to the embodiment with two charge stores 30 shown in FIG. 2, more or fewer charge stores are also conceivable. With only one charge store, only one sampled value is obtained per measurement. Two measurement repetitions here determine the phase, as explained in the introduction with reference to FIG. 3a, only while neglecting background light so that at least a third measurement repetition is preferably performed. Any desired number of sampled values can be produced by further measurement repetitions if the longer measurement time is accepted and the scene is sufficiently static. With more charge stores, for example four charge stores, additional sampled values are already obtained per measurement repetition so that charge stores can in a certain way be exchanged with measurement repetitions.

Suitable calibration data can in each case be stored for the different operating modes. A conventional camera uses only one set of calibration data for its fixed number of measurement repetitions. By selecting a respective suitable set of calibration data for the currently selected number of measurement repetitions, the accuracy of the measurement of the 3D time-of-flight camera 10 is increased again.

The control and evaluation unit 34 is configured for a pre-processing of 3D image data in some embodiments. For example, it performs smoothing with a filter core having a 3×3 or 5×5 size or other image processing processes. These image processing processes can be switched on and off or can be differently parameterized. Specifically, it is conceivable to perform this adaptation in each case in dependence on the number of measurement repetitions by which the raw 3D image data was measured.

In principle, the switchover between any desired numbers of measurement repetitions is possible. Two, three, or four measurement repetitions are of particular practical relevance. The switchover can be possible between only two of these numbers or all three numbers.

A short reaction time or response time is particularly advantageous for applications in safety technology. A 3D time-of-flight camera 10 used there is then safely configured as described in the introduction. For example, it is very fast in an operating mode with only two measurement repetitions and can, if necessary, transition to an operating mode with a higher measurement accuracy after an object has been detected in order to evaluate the hazard.

The criteria according to which it is possible to switch between the operating modes having a respective number of measurement repetitions, are manifold. First, manual switchovers by the user or the fitter are conceivable. A suitable camera configuration for a specific application or application situation is set and is then maintained for a subsequent operating phase. This also does not have to be a fixed specification for the number of measurement repetitions, but can also, for example, be a predefined change cycle. Such user specifications preferably take place on the initialization or putting into operation or on a new configuration.

A particular advantage results from the possibility of a dynamic switchover that can also be situation-specific. The decision on the respective switchover can be made automatically in the 3D time-of-flight camera 10, can be externally triggered, or can be jointly made internally and externally.

The decision on the switchover preferably incorporates own detection results, i.e. measurement data, in particular depth measurement values or amplitude measurement values, but also more complex image processing results from the last n≥1 frames and possibly also external data of a higher-ranking system are included.

For example, in a free detection zone 18, it is possible to measure with a minimum number of only two measurement repetitions. The higher measurement uncertainty can be accepted with a free field of view. The detection zone 18 does not have to be empty, but can include expected or uninteresting objects. One example is the use of the 3D time-of-flight camera 10 in a conveyor belt application, where measurements are performed with only two measurement repetitions as long as the conveyor belt is empty. The detection of the conveyor belt itself therefore has no influence on the switchover. As soon as a respective relevant object is detected, a switchover is made to a higher number of measurement repetitions.

The trigger for a switchover to a higher number of measurement repetitions can be the recognition of an object below a minimum distance that then needs to be localized more precisely in subsequent measurements. For example, an obstacle is reacted to in this manner in mobile applications to stop or to swerve in good time. A further application is the docking of an autonomous vehicle at a charging station or for a charge transfer, said docking measuring with maximum accuracy in this phase in order to position itself optimally.

The relevant field of view can in each case be restricted to one or more regions of interest. For example, the detection zone 18 is already considered to be free when the regions of interest are. Conversely, the detection of an object in a region of interest can trigger a high-precision measurement with a high number of measurement repetitions. Regions of interest are a comparatively simple image evaluation and more complex image evaluation methods such as object tracking are also conceivable. Then, a switchover is, for example, performed on the basis of an object speed or of an extrapolation of the object movement.

In addition to or instead of taking detection results into account, the switchover can also be made dependent on conditions and other sensor technology. The 3D time-of-flight camera 10 receives corresponding information or decisions from external via its interface 36. An example of this is the current vehicle speed determined with the aid of a vehicle control or a planned or current performed trajectory. A smaller number of measurement repetitions is more favorable in the case of fast driving, while with slow driving sufficient measurement time is available for an accurate measurement with many measurement repetitions. Or, for example during a cornering, a switchover is made to a number of two measurement repetitions since short measurement times are rather important here and a number of four measurement repetitions at the high angular velocities would result in too many measurement errors or invalid measurement values due to motion artifacts. In the example already mentioned above of the docking at a charging station or a transfer point for a charge, this situation does not have to be recognized from the detection results. This is known to the navigation or to the vehicle control that can trigger a switchover in good time.

However, a dynamic switchover does not have to be situational either. Instead, a cyclic switchover after every frame or every nth frame is conceivable or another predefined scheme between two or more different numbers of measurement repetitions.

The aspect of measurement accuracy and measurement duration has been the main focus so far. Furthermore, the energy consumption of the 3D time-of-flight camera 10 depends on the number of measurement repetitions. The switchover can therefore also be part of an energy management. For example, the switchover takes place such that the average electrical power remains constant. The 3D time-of-flight camera 10 thereby remains in a thermal balance, which has an advantageous effect on the measurement accuracy. In general, the energy consumption is minimized if every possibility is used to switch to a lower number of measurement repetitions. Whether a switchover to a larger number of measurement repetitions takes place can also be made dependent on the charge state of a rechargeable battery and on the operating duration still required.

In addition to the switchover of the number of measurement repetitions, there are further parameters that can be used for the adaptation of the camera properties and of the energy consumption. As explained, the non-ambiguity range can be increased by using a plurality of modulation frequencies. The number of modulation frequencies used and the modulation frequencies themselves are parameters by which the measurement range, measurement accuracy and energy consumption can be changed per distance measurement. These parameters are independent of the number of measurement repetitions.

The frame rate is likewise variable and the energy consumption can be reduced again by the lower frame rate. The frame rate can only be increased to a maximum value that is limited by the selected number of measurement repetitions and by the measurement duration required therefor. In some embodiments, there is a time averaging that can be adapted, or switched on and off between different frames.

The illumination unit 12 makes a decisive contribution to the energy consumption of the 3D time-of-flight camera 10. An adaptive illumination that in particular adapts its output power therefore likewise makes a contribution to a lower power consumption. For this purpose, depending on the current situation, individual ones of a plurality of illumination modules of the illumination unit 12 can be switched off. The exposure time could also be varied or the distribution of the transmission light can selectively take place in space and/or time by means of a suitable adaptive illumination.

The invention claimed is:

1. A method of detecting three-dimensional image data from a detection zone, comprising:
    transmitting transmission light that is modulated with a first modulation frequency;

receiving reception light from the detection zone and generating a plurality of reception signals therefrom with spatial resolution;

demodulating the reception signals with the first modulation frequency;

making amplitude measurements of the demodulated reception signals in order to obtain sampled values corresponding to the amplitude measurements;

making a number of subsequent amplitude measurements to obtain a plurality of subsequent sampled values, wherein each of the subsequent measurements is performed on subsequent reception signals demodulated with the first modulation frequency and at a known phase shift from the first modulation frequency of the transmission light, wherein the known phase shift of each of the subsequent measurements has a unique value;

determining a respective distance value from the sampled values and the subsequent sampled values, wherein the number of subsequent amplitude measurements is selectively adjustable; and performing calibration, wherein the calibration is performed with a stored calibration data set selected from a plurality of stored calibration data sets, the selected one of the stored calibration data sets having a number associated therewith matching the number of the subsequent amplitude measurements.

2. The method of detecting three-dimensional image data from a detection zone in accordance with claim 1, wherein the number of the subsequent amplitude measurements is in a range of two to five.

3. The method of detecting three-dimensional image data from a detection zone in accordance with claim 1, wherein the number of subsequent amplitude measurements comprises two, three, or four.

4. The method of detecting three-dimensional image data from a detection zone in accordance with claim 1, wherein the reception light is received by a plurality of light reception elements, and wherein the plurality of light reception elements have two charge stores, and wherein the two charge stores are read out differentially.

5. The method of detecting three-dimensional image data from a detection zone in accordance with claim 1, wherein the number of the subsequent amplitude measurements is adjusted for a subsequent operating phase.

6. The method of detecting three-dimensional image data from a detection zone in accordance with claim 1, wherein the number of subsequent amplitude measurements is adjusted dynamically as the subsequent amplitude measurements are being made.

7. The method of detecting three-dimensional image data from a detection zone in accordance with claim 6, wherein the number of the subsequent amplitude measurements is automatically adjusted.

8. The method of detecting three-dimensional image data from a detection zone in accordance with claim 6, wherein the number of the subsequent amplitude measurements is adjusted situationally based on the reception signals and/or the distance values.

9. The method of detecting three-dimensional image data from a detection zone in accordance with claim 6, comprising setting a first number of the subsequent amplitude measurements if a near object or an object in a region of interest within the detection zone is detected and/or setting a second number of subsequent amplitude measurements when no object is detected and/or when only objects classified as uninteresting are detected, wherein the first number is greater than the second number.

10. The method of detecting three-dimensional image data from a detection zone in accordance with claim 6, wherein the number of the subsequent amplitude measurements is adjusted cyclically or in accordance with a defined scheme.

11. The method of detecting three-dimensional image data from a detection zone in accordance with claim 1, wherein the number of the subsequent amplitude measurements is adjusted in accordance with an energy consumption of a 3D time-of-flight camera.

12. The method of detecting three-dimensional image data from a detection zone in accordance with claim 1, wherein the number of the subsequent amplitude measurements is adjusted in accordance with an energy consumption of a 3D time-of-flight camera to keep the energy consumption constant or to ensure a minimum operating duration.

13. The method of detecting three-dimensional image data from a detection zone in accordance with claim 1, wherein the number of the subsequent amplitude measurements is adjusted in accordance with a control signal from a control input.

14. The method of detecting three-dimensional image data from a detection zone in accordance with claim 1, wherein the subsequent amplitude measurements are made with at least a second modulation frequency.

15. The method of detecting three-dimensional image data from a detection zone in accordance with claim 14, wherein the at least a second modulation frequency comprises a plurality of second modulation frequencies, wherein each of the second modulation frequencies is adjustable and/or a number of the second modulation frequencies is adjustable.

16. The method of detecting three-dimensional image data from a detection zone in accordance with claim 1, comprising changing a frame rate at which the distance values are generated and/or adapting the transmission light produced by an illumination unit.

* * * * *